Figure 1:
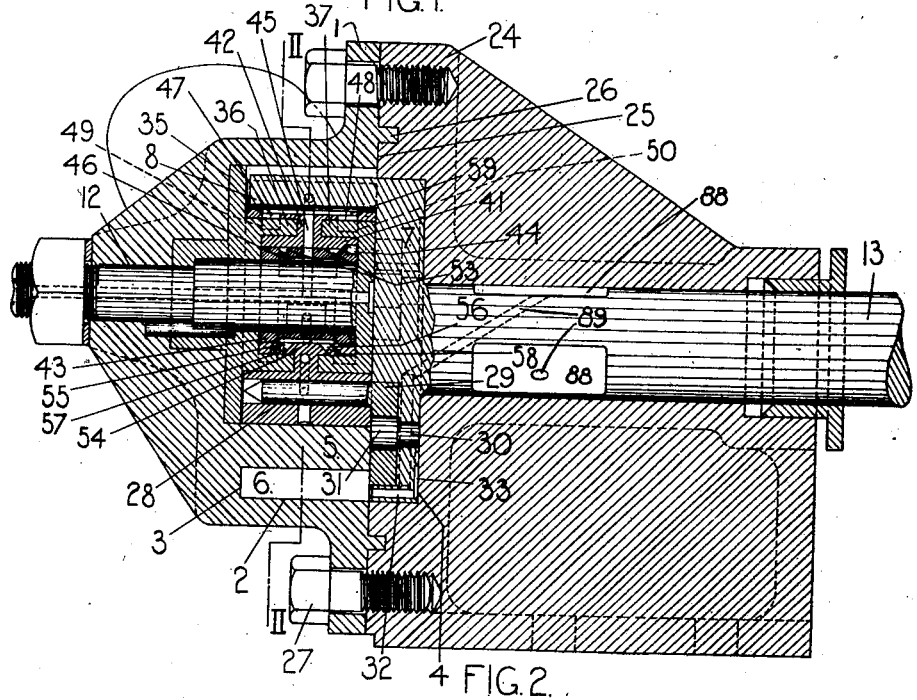

July 19, 1938.  F. G. FOSTER ET AL  2,124,140

ENGINE, PUMP, METER, AND THE LIKE

Filed Aug. 18, 1936  3 Sheets-Sheet 1

INVENTOR
FRANK GEDEN FOSTER
LAURENCE JOSEPH LAMBE
BY
ATTORNEY

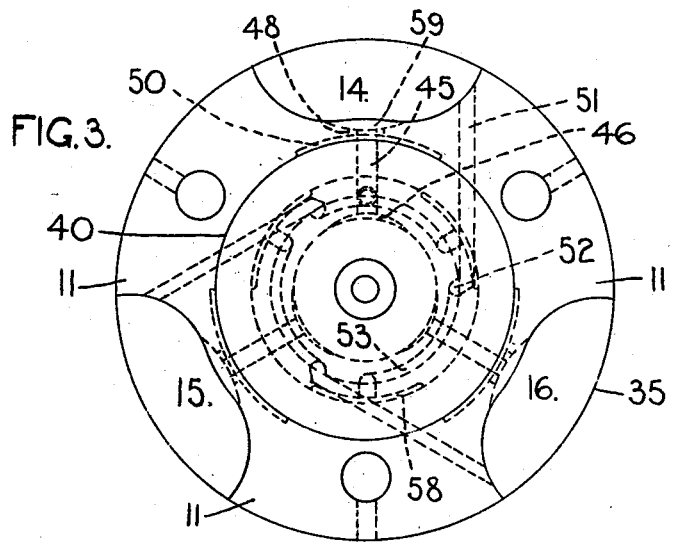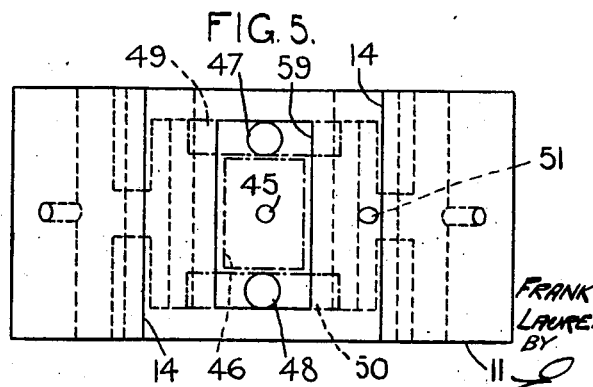

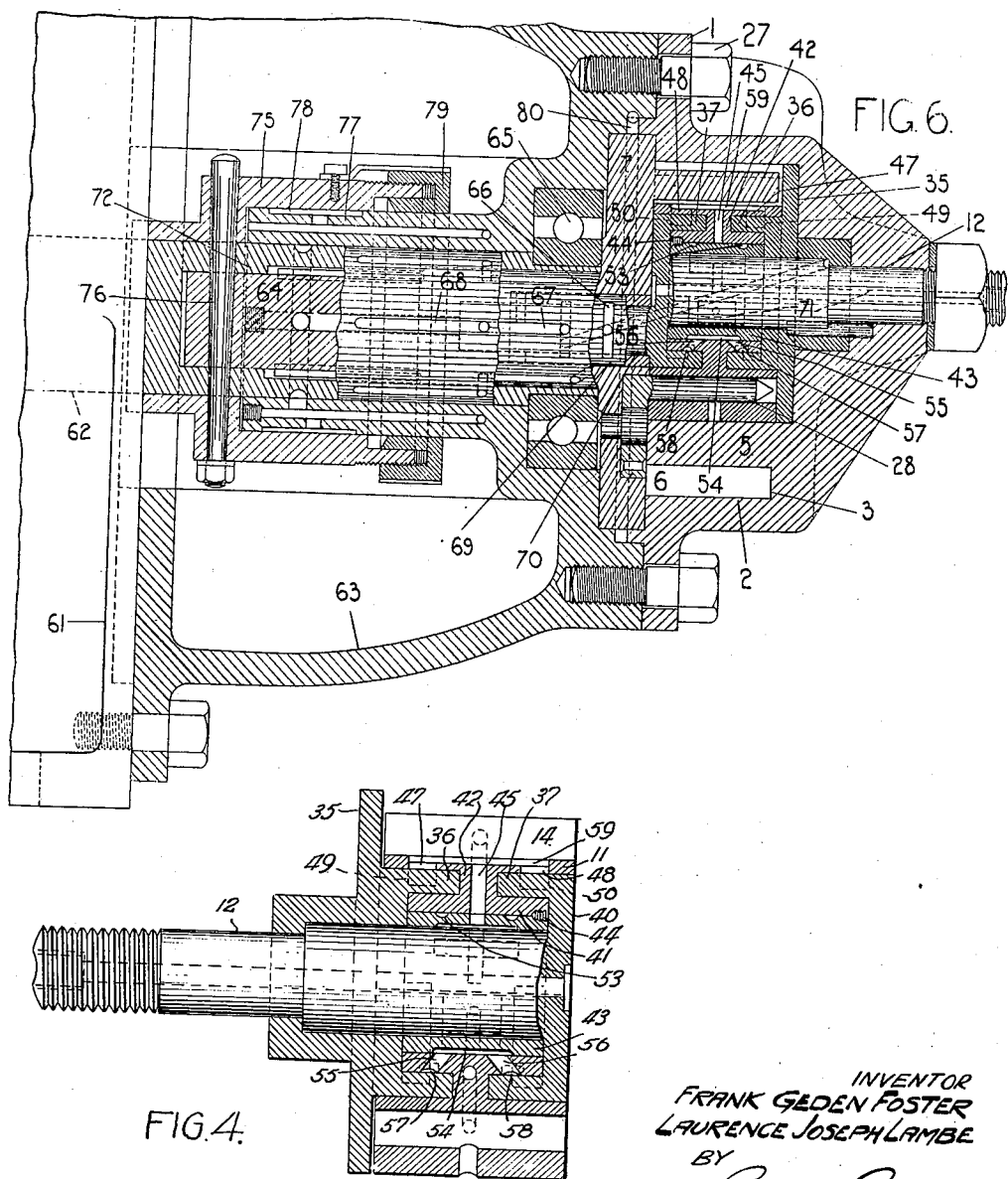

Patented July 19, 1938

2,124,140

UNITED STATES PATENT OFFICE 2,124,140

ENGINE, PUMP, METER, AND THE LIKE

Frank Geden Foster, Doncaster, and Laurence Joseph Lambe, Hampstead, London, England Application August 18, 1936, Serial No. 96,684
In Great Britain August 19, 1935

6 Claims. (Cl. 103—125)

This invention relates to engines, pumps and meters with more especial reference to those comprising a casing having a cylindrical wall, side walls and an intermediate crescent-shaped wall projecting from one of said side walls and forming with the cylindrical wall a piston chamber, inlet and outlet ports to said chamber, a rotor mounting pistons which traverse said chamber during the working of the engine, and an eccentrically mounted rotating seal member having pockets in its periphery for the receipt of the pistons with circular peripheral portions joining the pockets and isolating the inlet and outlet ports one from the other.

In engines of this character, the pressure on the delivery side produces a diametrical thrust tending to force the rotating parts in the direction of the suction side and resulting in unbalanced operating conditions, and one object of the present invention is to provide a construction of engine, pump or meter wherein the pressures on the rotating elements are more uniformly balanced.

According to one phase the invention comprises furnishing the pockets of the rotating seal member with ports opening up communication with the interior cylindrical or normal bearing surface of the rotating seal whereby to obtain substantial equalization of the pressures prevailing at each face thereof.

Preferably, the bearing or abutment upon which the rotating seal revolves is of large diameter to reduce, as far as possible, the area of the rotating seal subject to the unbalanced delivery pressure, a convenient form of bearing being provided by an annular abutment with the rotating seal formed as a cage thereabout so as to have an inner surface bearing on the annular abutment and a part-cylindrical flange rotating nominally clear of the abutment.

Further to balance the delivery pressure at the face of the seal in addition to the ports opening up connection between the seal pockets and the interior cylindrical or normal bearing surface of the rotating seal, extra ports or conduits are furnished connecting each pocket of the seal member respectively with a diametrically opposite external bearing surface, thereby to augment the area under pressure available to balance the unwanted diametrical thrust.

In an embodiment of pump according to patent specification No. 1,994,397 adapted for pressure equalization by the present invention, the rotating seal is formed as a dual annulus or collar, the two parts of which are concentric and connected by a central radial web, and the inner annulus providing inner and outer bearing surfaces on a central journal or abutment appropriate for the purpose.

This journal or abutment conveniently comprises a bearing pin detachably, and it may be adjustably, borne in one side wall, preferably the removable cover of the engine casing, the head of the bearing pin within the casing being furnished with a cylindrical cup-shaped abutment, and a similar oppositely disposed cup-shaped abutment being formed preferably integrally with the aforementioned side wall or cover.

The inner annulus or collar of the rotating seal occupies the annular space between the bearing pin and the circumferential walls of the opposed cup-shaped abutments, the space between the ends of such opposed walls being occupied by the aforementioned radial web joining the inner and outer annuli of the rotating seal.

As will be appreciated, for ready assembly, the bearing pin is insertable and withdrawable from the inner side of the removable cover and the arrangement has the advantage not only of increasing the bearing surfaces and consequently the area available for balancing purposes, but also provides a bearing for the rotating seal the axial dimension of which may coincide with that of the seal, thereby eliminating overhang and any tendency of the seal to rock or vibrate during the working of the engine.

Where the ports opening up communication between the pockets of the rotating seal and the bearing surface on the central pin are provided, these occupy a position centrally of the pockets and pass inwardly through the radial web, the ports or conduit according to the invention being separate and distinct therefrom and opening communication between the pocket at one side of the seal and the external bearing surface of the inner annulus at the opposite side.

To this end, recourse is had to grooves on the inner surface of the smaller annulus, which grooves are closed and isolated one from the other by a removable bush, it may be of bronze, which is slid within the annular member and secured against movement therein to form the bearing proper turning on the central pin.

Figure 2:
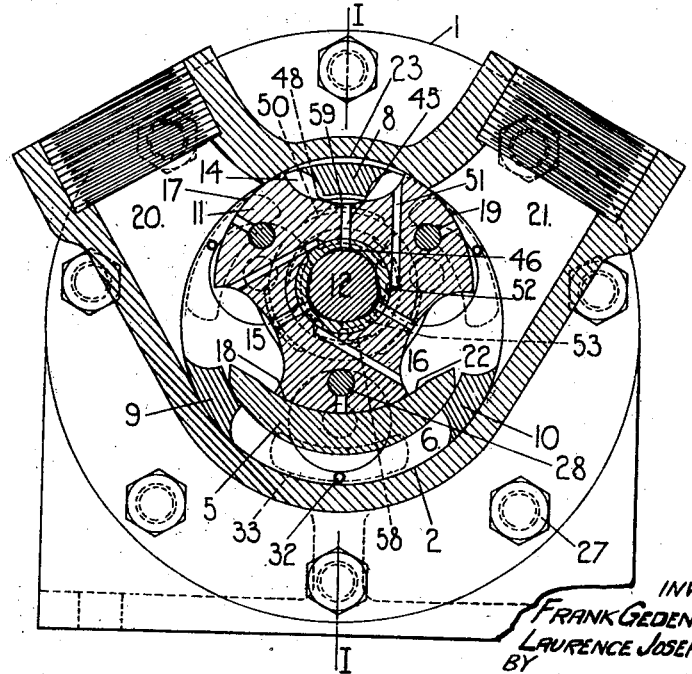

The invention will further be described with reference to the accompanying explanatory drawings which illustrate two embodiments by way of example and in which Figs. 1 to 5 show one embodiment of three piston liquid pump or engine, Fig. 1 being a longitudinal section, Fig. 2, a cross section, Fig. 3, an end view of the rotating seal, Fig. 4, a section thereof, and Fig. 5, a plan, while Fig. 6 is a longitudinal detail section of one unit of a dual pump or engine with the rotors oppositely arranged to provide axial balance.

Referring now to the drawings but first more particularly to Figs. 1 to 5 as in the aforementioned patent specification No. 1,994,397, the engine or pump comprises a casing generally designated 1 having a cylindrical wall 2, side walls 3 and 4 and an intermediate crescent-shaped wall 5 projecting from the side wall 3 and forming with the cylindrical wall 2 a piston chamber 6. 7 is a rotor mounting pistons 8, 9 and 10 which traverse the piston chamber 6 during the working of the engine, and 11 generally designates a rotating seal member mounted on a pin 12 eccentrically disposed in relation to the axis of the rotor shaft 13, the seal member 11 having pockets 14, 15 and 16 for the receipt of the pistons 8, 9 and 10 respectively with circular peripheral portions 17, 18 and 19 joining the pockets and isolating the inlet and outlet ports 20 and 21 one from the other by nominal contact on the one hand with the inner circular face 22 of the crescent-shaped wall 5, and on the other hand by nominal contact with an arcuate recess 23 provided in the cylindrical wall 2 of the engine or pump.

By reference to Figs. 1 and 2, it will be seen that the main casing 1 is a cup shaped member flanged to engage a second casting 24 which constitutes the bearing for the rotor shaft 13 and which has a circular recess on its front face 25 receiving the rotor 7. Moreover, the flange face of the casing 1 is formed with dowels or a circular rib 26 co-operating with a recess or recesses in the front face 25 of the casting 24 correctly to position the casing which is secured by bolts 27 with its circular cylindrical wall 2 concentric with the axis of the rotor shaft 13.

Synchronized rotation between the rotor 7 and seal 11 is effected by a crank pin connection between these latter as in the aforementioned specification. A preferred form of crank connection is clearly illustrated in Fig. 1, and it will be noted that the seal member 11 is bored through to provide a long bearing for each crank pin 28. 29 is a collar formed integrally on each pin 28 and recessed in the face of the rotor 7 the recess providing a bearing surface for the collar which bearing surface is increased or augmented by a shouldered pin 30 secured in the rotor 7 and having an enlarged circular boss 31 supporting the internal diameter of the collar 29. The collar, which during the working of the engine and the transmission of the drive from the rotor 7 to the seal 11 rotates, is thus furnished both with an internal and an external bearing surface giving approximately double the bearing area which would otherwise be obtained.

The pin 12 bearing the rotating seal 11 is mounted in the casing 1 and carries a removable end plate 35, which takes up the wear consequent on the rotation of the seal 11 between it and the front face of the rotor 7, while substantial equalization or balance of the pressures prevailing upon the rotating seal during the working of the engine is obtained by means of the arrangements now to be described with more particular reference to Figs. 2, 3, 4 and 5.

The port arrangements for each pocket 14, 15 and 16 to obtain substantial equalization of the pressures are facsimiles of each other and the same reference numerals are given to the corresponding ports for each pocket.

As will be seen more clearly from Figs. 2 and 4, the removable end plate 35 is formed with an annular flange 36 projecting within the rotating seal 11, a corresponding oppositely directed flange 37 being formed on a plate or head 40 at the inner end of the bearing pin 12. An annular cavity is thus formed between the flanges 36 and 37 and the bearing surface of the pin 12, the rotating seal having an inner sleeve 41 within this cavity which sleeve is connected to the main body of the seal by a radial web 42 passing outwardly between the annular flanges 36 and 37. In this manner the bearing surface about which the seal rotates is considerably augmented and as will be appreciated comprises (1) the portion of the bearing pin 12 encircled by the sleeve 41, (2) the external cylindrical surfaces of the flanges 36 and 37, and (3) the internal cylindrical surfaces of these flanges 36 and 37.

43 is a bush of phosphor-bronze or other appropriate bearing material inserted within the sleeve 41 to bear on the pin 12 being fixed for rotation with the sleeve by means of a grub screw 44.

The base of each seal pocket 14, 15 or 16 is formed centrally with a radial port or conduit 45 passing inwardly through the radial web 42 and through the bush 43 to the bearing surface of the latter member on the central pin 12, a shallow cavity 46 being cut in the bearing surface of the bush as shown more clearly in Fig. 3 which cavity is thus at all times under the same pressure conditions as those prevailing in the pocket.

In the base of each pocket laterally of the port 45 further ports 47 and 48 are provided and communicate respectively with arc-shaped shallow channels 49 and 50 cut on the inner surface of the seal in the area thereof bearing respectively upon the external cylindrical faces of the flanges 36 and 37.

Delivery pressure, to which the area of the rotating seal 11 open to the delivery port 21 is subject and which would otherwise tend to urge the rotating seal towards the suction side of the pump, is thus admitted through the ports 45, 47 and 48 to the cavities 46, 49 and 50 wherein it exerts a counteracting thrust substantially balancing the diametric thrust applied at the circumference of the rotating seal, and therefore permitting the latter member to rotate freely about its bearings.

Where the cavities 46, 49 and 50 afford insufficient area to counter-balance the diametric thrust, equalization of the lateral pressure prevailing upon the seal may be had by recourse to the inner bearing surfaces of the flanges 36 and 37 aforementioned to which end each pocket is furnished with a port 51 to a duct extending inwardly in the central plane of the seal to reach the inner surface of the sleeve 41 and there connect with a groove 52 cut in the surface of the bush 43. From the groove 52 circumferential grooves 53 extend around the outer surface of the bush 43 and communicate with a cavity 54 shown more clearly in Fig. 4 from which branch further ducts 55 and 56 in the inner sleeve 41 of the rotor to arcuate channels 57 and 58 on the external bearing surface thereof. By means of the ducts and grooves 51, 52, 53, 54, 55 and 56 the pressure conditions prevailing at one surface of the rotating seal are communicated to a diametrically opposite zone on the internal bearing area of the annular flanges 36 and 37 so that complete diametric pressure balance of the seal member 11 can be had if desired.

The pockets 14, 15 and 16 in the rotating seal 11 are so shaped not only freely to receive their respective pistons 8, 9 and 10 but also to remove any likelihood of a body of liquid being trapped between the faces of the piston and the pocket wall which it will be noted is formed with a shallow recess 59 extending across the base of each pocket and from which the ports 45, 47 and 48 debouch.

The delivery pressure not only produces a diametric thrust as aforementioned, but also where an overhung piston carrying rotor such as 7 is utilized an axial thrust pressing such rotor into frictional contact with the adjacent side wall of the casing and according to the present invention means are provided for removing this objection and effecting equalization of pressure at both faces of the piston carrying rotor 7.

Referring more particularly to Figs. 1 and 2, between each pair of pistons the rotor 7 is furnished with a port or aperture 32 opening up communication between the piston chamber 6 at the front face of the rotor and shallow pressure equalizing cavities 33 of segmental form at the rear face of the rotor 7 the area of each cavity 33 corresponding to the superficial area at the front of the piston exposed to delivery pressure. By this arrangement any variation in the pressure prevailing within the piston chamber 6 or at the front face of the rotor is communicated through the ports or apertures 32 in the rotor 7 to the cavities 59 at its rear face the rotor thus operating under conditions of axial balance.

The cavities 59 need not be more than $\frac{1}{32}''$ in depth and since the remainder of the rear face of the rotor 7 is flat and in nominal contact with the side wall 4 of the casing, there is an adequate sealing surface eliminating any likelihood of leakage between the suction and delivery ports 20 and 21 across the face of the rotor.

An alternative mode of obtaining axial balance is by arranging two pumps or engines on said shaft back to back or with their rotors oppositely arranged and an embodiment of this character is illustrated in Fig. 6.

Referring now to Fig. 6, 61 designates the casing of an electric motor or prime mover, 62 the power shaft thereof and 63 an extension casing mounting the pump comprising a cover 1 attached to the extension casing 63 by bolts 27 in a manner similar to that illustrated in the preceding figures.

The main pump components are also similar to those previously illustrated and are designated by the same reference numerals but the rotor shaft 64 which forms an axial extension of the power shaft 62 is carried in ball bearings 65 mounted within the extension casing 63 immediately in rear of the rotor 7.

Moreover, as a duplicate pump is mounted on the opposite end of the shaft 62 the pumps axially balance each other and special provision therefore by means of the ports 32 and cavities 33 of the first embodiment is superfluous.

A further force creating unbalanced pressure is the torque required in rotating the pistons 8, 9 and 10 and impelling the liquid through the delivery port 21 which torque, since the rotor is overhung, will react within the shaft bearings in rear of the rotor tending to cause wear thereat.

In the embodiment illustrated in Fig. 6, however, this tendency is eliminated or substantially reduced by successively opening the areas on the shaft which will be subject to wear to the delivery pressure by means of ports 66, 67 and 68 so disposed and arranged that in the working of the pump the bearing areas successively accommodating the torque reaction are in turn and appropriately opened to delivery pressure so that wear on the bearings is substantially reduced and rendered uniform over the whole area thereof.

In a three piston pump such as those illustrated there will be three equi-spaced shaft grooves 67, 68, each 90° behind its respective piston 8, 9 or 10 in the direction of rotation, so that where rotation in both directions may be required, two effective sets of grooves 68 are necessary.

To this end in Fig. 6 there is provided on the bearing pin 12 an extension 70 carrying a ported sleeve 69 within and co-axially of the rotor shaft 64 in such manner that the sleeve 69 can turn 180° about the extension 70 and moreover is so turned to one or other extremity of its permitted movement according to the direction of rotation of rotor shaft 64. 71 is a conduit within the bearing pin 12 adapted to be connected to delivery pressure via the end of such pin 12 and a pipe (not shown) and through the supported sleeve 69 to the appropriate balancing grooves 67, 68 on the rotor shaft.

The grooves 67 are on the rotor shaft proper 64 and the grooves 68 on the surrounding tubular extension 72 of the motor shaft 62.

75 is a cup-shaped member fixed for rotation with the shaft 64 by a cotter pin 76, and encircling a sleeve 77 on the casing 63. In the working of the pump any fluid under pressure which may leak along the rotor shaft 64 reaches circumferential cavities 78 in the sleeve 77 and is there retained by the packing gland 79, so that a fluid bearing for the rotor shaft 64 is virtually obtained.

80 is a circumferential groove formed round the rotor 7 in the extension 63 or the casing 1 which groove is connected to the delivery side of the pump so that the rotor similarly floats in a bath of liquid under pressure.

Reverting now to the embodiment illustrated in Figs. 1 and 2, shallow troughs or grooves 88 are cut in the surface of the rotor shaft 13 and through ports 89 in the shaft and rotor are connected to diametrically opposite zones on the rotor face whereby the fluctuating pressures at such face during the working of the pump are simultaneously applied to the respective shallow troughs 88 whereby to assist in diametrically balancing the rotor.

Moreover, it will be understood that although in the foregoing description mention has particularly been made of the access of the delivery pressure via the ports to the balancing cavities, fluid under pressure is not trapped therein but, during the working of the pump, the ports successively open the cavities also to suction after an intermediate sealing period.

Lastly, in place of the three pistons 8, 9 and 10 illustrated, the rotor may be furnished with any appropriate number thereof, with corresponding pockets in the rotating seal 11.

By the present invention an improved engine, pump or meter is obtained in which the working fluid is able to exercise a lubricating effect on the wearing surfaces, and which for use as a deep well or similar pump may be combined with a squirrel cage electric motor in a totally enclosed casing without need for packing glands.

What we claim is:—

1. An engine, pump or meter comprising a casing having a cylindrical wall, side walls and an intermediate crescent shaped wall projecting from one of said side walls and forming with the cylindrical wall a piston chamber, inlet and outlet ports to said chamber, a rotor mounting pistons which traverse said chamber during the working of the engine and a rotating seal member, having pockets for said pistons, a bearing for said rotating seal member, projecting from said one of the side walls eccentrically of the rotor, said seal member being formed as a dual annulus or collar about said bearing and being ported to open communication between the pockets therein and the adjacent surfaces of the bearing.

2. An engine, pump or meter, according to claim 1, wherein the adjacent surfaces of the bearing are formed with shallow cavities successively receiving the medium under pressure through the ports in said rotating seal thus to counteract the diametric thrust exerted by the delivery pressure on the rotating seal member.

3. An engine, pump or meter comprising a casing having a cylindrical wall, side walls and an intermediate crescent-shaped wall projecting from one of said side walls and forming with the cylindrical wall a piston chamber, inlet and outlet ports to said chamber, a rotor mounting pistons which traverse said chamber during the working of the engine, and an eccentrically mounted rotating seal member having pockets for said pistons formed as a dual annulus or collar, the two parts of which are concentric and connected by a central radial web, the inner annulus providing both inner and outer bearing surfaces and said radial web being ported to open communication between the pockets therein and the inner and outer bearing surfaces to balance the diametric thrust on the rotating seal member.

4. An engine, pump or meter according to claim 3 including a bearing for the rotating seal member comprising a central journal for the inner bearing surface of the inner annulus and two cup-shaped or flanged bearing members on said journal projecting between the annular portions of the seal member and providing an augmented bearing surface both externally of the inner annulus and internally of the outer annulus with ports in the seal member opening communication between the pockets and diametrically opposite bearing surfaces internally of the outer annulus further to balance the diametric thrust on the rotating seal member.

5. An engine, pump or meter according to claim 3 wherein a bearing bush of bronze or other appropriate material is interposed between the seal member and its journal for rotation with the seal member and is ported or grooved to pass fluid under pressure to cavities on the inner surface of the bush, which thus respond to the varying pressure for balancing purposes.

6. An engine, pump or meter according to claim 1 wherein the rotor is furnished between the pistons with ports opening up communication between the piston chamber at the front face of the rotor and shallow pressure equalizing cavities of segmental form provided in the rear face of the rotor.

FRANK GEDEN FOSTER.
LAURENCE JOSEPH LAMBE.